US012578698B2

(12) United States Patent
Okamoto et al.

(10) Patent No.: US 12,578,698 B2
(45) Date of Patent: Mar. 17, 2026

(54) INSPECTION SUPPORT METHOD, INSPECTION SUPPORT APPARATUS, AND INSPECTION SUPPORT PROGRAM

(71) Applicant: Konica Minolta, Inc., Tokyo (JP)

(72) Inventors: Yasuhiro Okamoto, Tokyo (JP); Hisanori Kawashima, Tokyo (JP); Ryo Minegishi, Tokyo (JP); Shunsuke Takamura, Tokyo (JP); Takashi Ohta, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 117 days.

(21) Appl. No.: 18/623,527

(22) Filed: Apr. 1, 2024

(65) Prior Publication Data

US 2024/0248448 A1 Jul. 25, 2024

Related U.S. Application Data

(63) Continuation of application No. 16/976,459, filed as application No. PCT/JP2018/046120 on Dec. 14, 2018, now abandoned.

(30) Foreign Application Priority Data

Oct. 29, 2018 (JP) ................................. 2018-202999

(51) Int. Cl.
*G08B 21/00* (2006.01)
*G01N 21/3518* (2014.01)
(Continued)

(52) U.S. Cl.
CPC ..... *G05B 19/0425* (2013.01); *G01N 21/3518* (2013.01); *G06T 7/0004* (2013.01); *G06T 7/90* (2017.01)

(58) Field of Classification Search
CPC ............ G05B 19/0425; G05B 23/0272; G05B 19/4184; G01N 21/3518; G01N 21/88; (Continued)

(56) References Cited

U.S. PATENT DOCUMENTS

2001/0013832 A1 8/2001 Chavand
2004/0075689 A1 4/2004 Schleiss
(Continued)

FOREIGN PATENT DOCUMENTS

JP 2015-172829 10/2015
JP 2017-90190 5/2017
(Continued)

*Primary Examiner* — Mark S Rushing
(74) *Attorney, Agent, or Firm* — COZEN O'CONNOR

(57) ABSTRACT

An inspection support method on inspection of a gas or petroleum-related production facility, by receiving registration of producer information on a producer that owns or manages the production facility, receiving registration of production facility information on the production facility, receiving registration of inspector information on each of a plurality of inspector candidates that are candidates to inspect the production facility, acquiring the registered production facility information on the production facility, acquiring the registered inspector candidate information on the inspector candidate, and outputting inspection-related information containing inspection schedule information on a schedule of inspection of the production facility by the inspector candidate, based on the acquired production facility information and the acquired inspector candidate information.

20 Claims, 11 Drawing Sheets

(51) Int. Cl.
  *G05B 19/042*       (2006.01)
  *G06T 7/00*         (2017.01)
  *G06T 7/90*         (2017.01)
(58) Field of Classification Search
  CPC . G01N 2021/1795; G06T 7/0004; G06T 7/90;
                Y02P 90/02; Y02P 90/80; G06Q 10/00
  USPC ........................................... 340/500; 700/79
  See application file for complete search history.

(56)                    References Cited

U.S. PATENT DOCUMENTS

| | | | |
|---|---|---|---|
| 2005/0038825 A1* | 2/2005 | Tarabzouni | G06F 16/29 |
| 2007/0078765 A1* | 4/2007 | Holton | G06Q 20/102 |
| | | | 705/40 |
| 2007/0100583 A1* | 5/2007 | Yano | G05B 23/0216 |
| | | | 702/184 |
| 2012/0054242 A1* | 3/2012 | Ferrara | G06F 16/951 |
| | | | 709/217 |
| 2014/0039648 A1* | 2/2014 | Boult | G05B 23/0283 |
| | | | 700/79 |
| 2014/0277605 A1 | 9/2014 | Nixon | |
| 2015/0160630 A1 | 6/2015 | Makishima | |
| 2017/0192403 A1* | 7/2017 | Cameron | G05B 19/042 |
| 2017/0307465 A1 | 10/2017 | Yokono | |
| 2018/0365659 A1 | 12/2018 | Yamanami | |

FOREIGN PATENT DOCUMENTS

| | | |
|---|---|---|
| WO | WO 2015/019806 | 2/2015 |
| WO | WO 2016/143754 | 9/2016 |

* cited by examiner

200

4

30

200

INSPECTOR

PRODUCTION
FACILITY C

PRODUCTION FACILITY A

PRODUCTION FACILITY B

PRODUCTION FACILITY D

FIG. 8

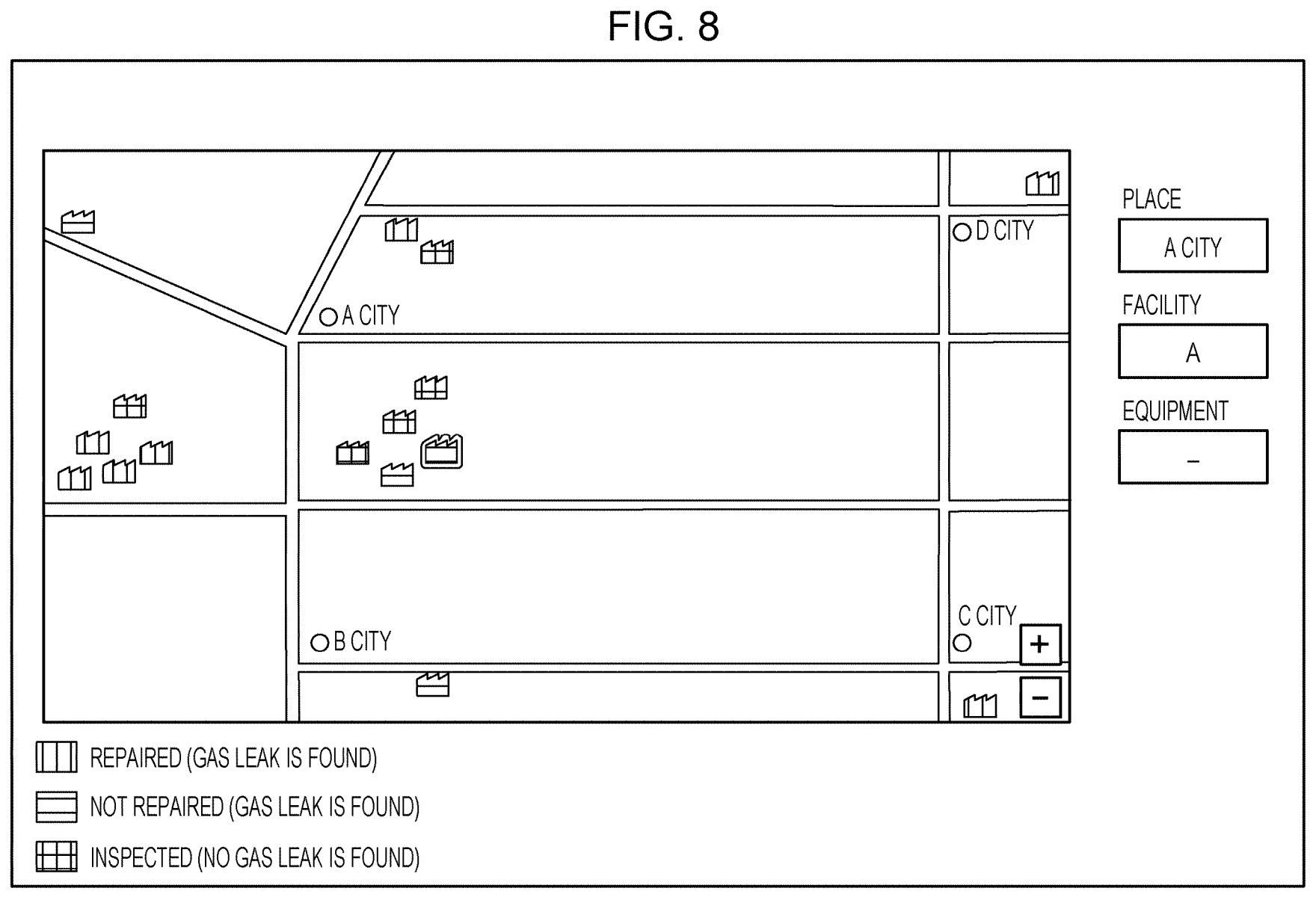

PLACE

| A CITY |

FACILITY

| A |

EQUIPMENT

| - |

D CITY

C CITY

+

-

A CITY

B CITY

REPAIRED (GAS LEAK IS FOUND)

NOT REPAIRED (GAS LEAK IS FOUND)

INSPECTED (NO GAS LEAK IS FOUND)

FIG. 9

PLACE

A CITY

FACILITY

A

EQUIPMENT

A1111

+

|

INSPECTION SUPPORT METHOD, INSPECTION SUPPORT APPARATUS, AND INSPECTION SUPPORT PROGRAM

RELATED APPLICATIONS

This application is a continuation of U.S. Ser. No. 16/976,459 filed Aug. 27, 2020 which is a U.S. National Stage of International Application No. PCT/JP2018/046120 filed Dec. 14, 2018, which claims priority of Japanese application no. 2018-202999 filed Oct. 29, 2018, the entire content of which are hereby incorporated by reference

FIELD OF THE INVENTION

The present invention relates to an inspection support method, an inspection support apparatus, and an inspection support program.

BACKGROUND OF THE INVENTION

For example, in production equipment that produces natural gas or petroleum or production plants that produce chemicals by using gas, pipes and apparatuses through which gas flows are arranged in huge sites. Hereinafter, production equipment and production plants are referred to as "production facilities".

Leak of gas in production facilities may lead to, for example, explosion, accelerating global warming, or adversely affecting health. For this reason, inspectors regularly make the rounds in sites and perform an inspection for gas leak in production facilities. In addition, an inspection of production facilities is also performed in an emergency, such as in the event of earthquake.

For example, WO 2016/143754 describes a gas leak detection apparatus that detects a gas leak in an inspection area by using the infrared absorption characteristics of gas.

SUMMARY OF INVENTION

Incidentally, when an order is placed with a specific inspector (including an inspection company) for an inspection of a production facility, schedules may conflict between the inspector and a producer (a person or company that manages (hereinafter, including "owns") the production facility).

Performing an inspection under an unreasonable schedule may lead to a decrease in the quality of inspection, such as missing a gas leak, with the result that the trust of a producer may be lost. In addition, there is a problem that a low-quality inspection may not meet the requirements of laws and regulations on an inspection of a production facility.

Because of coincidence of an increase in petroleum gas production with application of more stringent laws and regulations on gas leak inspections and the problem of the aging of inspectors, there also occurs a problem that it is difficult to find inspectors having a certain level of skill. Furthermore, because of the aging of production facilities, and the like, it is conceivable that subjects of production facilities required for inspection and the frequency of inspection (the count of inspections) increase. Therefore, it is required to efficiently make inspection plans for production facilities.

When an inspector cannot receive an order for inspection because of a schedule conflict between the inspector and a producer, or when the count of orders for inspection that an inspector receives because of irregularities of the time of schedule matching and the time of schedule conflict is uneven, it is difficult to efficiently make an inspection plan for a production facility.

In a situation in which the count of inspections of an inspector increases, schedule conflicts generally often occur between the inspector and a producer, so there is a problem that it is significantly difficult to efficiently make an inspection plan for a production facility and, by extension, to raise the efficiency of inspection of the production facility.

It is an object of the present invention to provide an inspection support method, inspection support apparatus, and inspection support program that are able to efficiently make an inspection plan for a production facility.

An inspection support method is disclosed for inspection of a gas or petroleum-related production facility, the inspection support method comprising:

receiving registration of producer information on a producer that owns or manages the production facility;

receiving registration of production facility information on the production facility;

receiving registration of inspector information on each of a plurality of inspector candidates that are candidates to inspect the production facility;

acquiring the registered production facility information on the production facility;

acquiring the registered inspector candidate information on the inspector candidate; and outputting inspection-related information containing inspection schedule information on a schedule of inspection of the production facility by the inspector candidate, based on the acquired production facility information and the acquired inspector candidate information.

According to another embodiment, as inspection support apparatus is disclosed, comprising:

a communication section receiving producer information on a producer that owns or manages a production facility associated with gas or petroleum, production facility information on the production facility, and inspector candidate information on an inspector candidate that is a candidate to inspect the production facility;

a storage section storing the producer information, the production facility information, and the inspector candidate information;

a production facility information acquisition section acquiring the production facility information from the storage section;

an inspector candidate information acquisition section acquiring the inspector candidate information from the storage section; and an inspection-related information output section outputting inspection-related information, containing inspection schedule information on a schedule of inspection of the production facility by the inspector candidate, based on the acquired production facility information and the acquired inspector candidate information.

An inspection support program is a program for causing a computer to execute processes, the processes comprising:

a process of acquiring production facility information on a production facility associated with gas or petroleum;

a process of acquiring inspector candidate information on an inspector candidate that is a candidate to inspect the production facility; and a process of outputting inspection-related information, containing inspection schedule information on a schedule of inspection of the production facility by the inspector candidate, based on the acquired production facility information and the acquired inspector candidate information.

According to the present invention, an inspection plan for a production facility is efficiently made.

BRIEF DESCRIPTION OF DRAWINGS

FIG. 8 is a view showing an example of an inspection report displayed in map;

FIG. 9 is a view showing an example of a plurality of facilities displayed in a magnified view on a display screen.

DETAILED DESCRIPTION OF THE DRAWINGS

Figure 1:
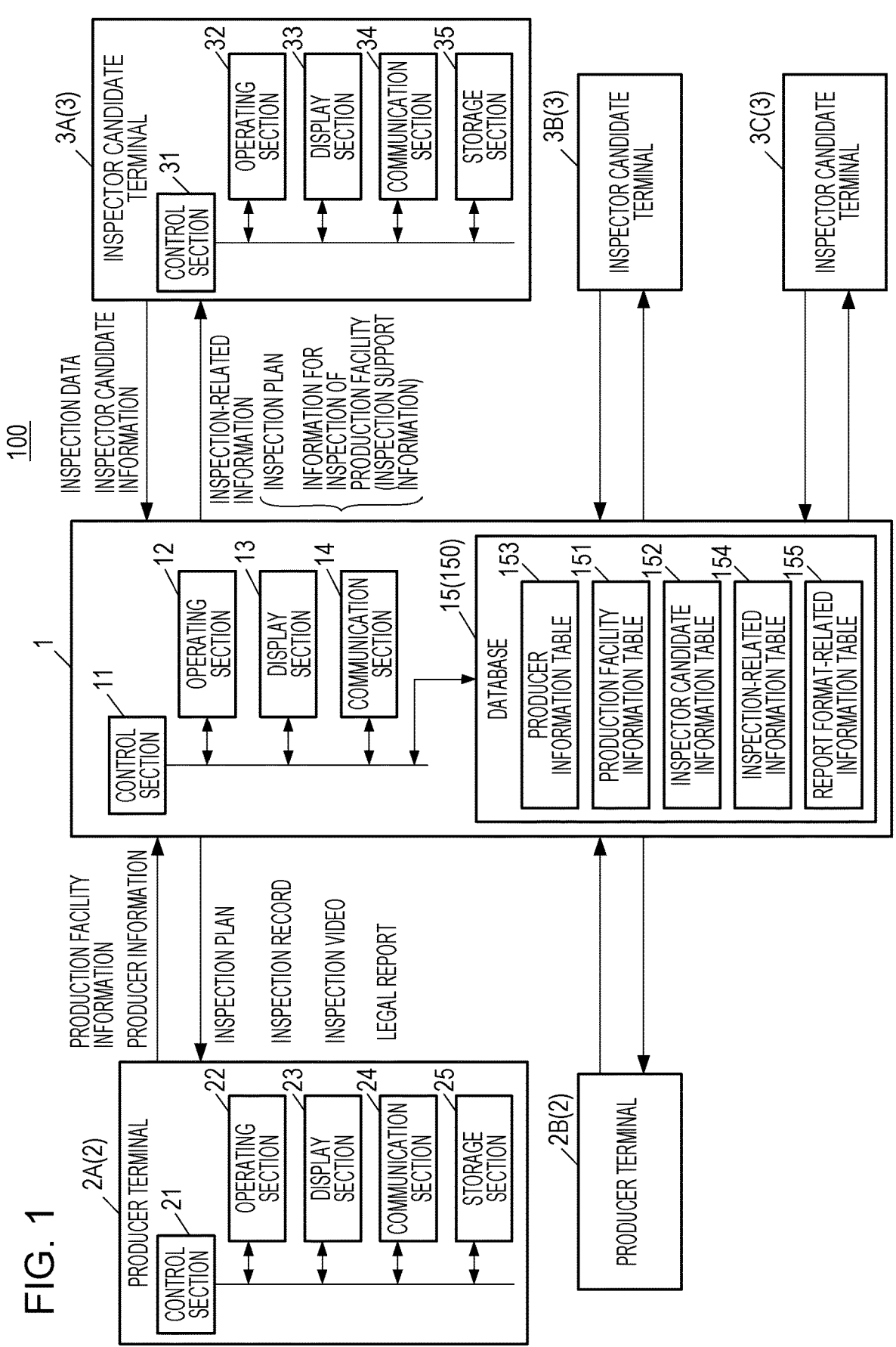
FIG. 1 is a block diagram showing the configuration of an inspection support system including an inspection support apparatus according to an embodiment of the present invention.

Hereinafter, the present invention will be described with reference to an embodiment. FIG. 1 is a block diagram showing the configuration of inspection support system 100 including inspection support apparatus 1 according to the present embodiment. Inspection support system 100 is a system that individually provides various pieces of information on inspections of production facilities to a plurality of companies that own or manage the production facilities and a plurality of inspectors or inspection companies that perform inspections of the production facilities. Here, production facilities are petroleum or gas-related production equipment, in details, production facilities that produce natural gas or petroleum or production facilities that produce chemicals by using gas, and, more specifically, for example, well facilities and gas piping equipment.

In the present embodiment, companies that manage production facilities register company information and information on the managing production facilities in inspection support apparatus 1 by using inspection support system 100. Inspectors or inspection companies register information on the inspectors or inspection companies in inspection support apparatus 1 by using inspection support system 100. Inspection support system 100 selects an inspector or an inspection company that satisfies a predetermined condition from among the plurality of registered inspectors or inspection companies. In the following description, "companies that manage production facilities" are referred to as "producers". Inspectors or inspection companies are typically referred to as "inspectors". Inspectors before being selected by inspection support system 100 are particularly referred to as "inspector candidates". Gas leak inspections of production facilities are simply referred to as "inspections".

Inspection support system 100 includes inspection support apparatus 1, producer terminals 2, and inspector candidate terminals 3. Producer terminal 2 is arranged for each producer, and producer terminals 2A, 2B are respectively arranged for different producers. The same applies to inspector candidate terminal 3, and inspector candidate terminals 3A, 3B, 3C are respectively arranged for different inspectors. The number of producer terminals 2 and the number of inspector candidate terminals 3, shown in FIG. 1, are illustrative and are present according to the number of registered producers and the number of registered inspectors. Alternatively, a plurality of terminals may be arranged for one producer or one inspector.

A communication between inspection support apparatus 1 and each of producer terminals 2A, 2B is performed via a network, for example, the Internet (not shown), or the like. A communication between inspection support apparatus 1 and each of inspector candidate terminals 3A, 3B, 3C is performed via a network, for example, the Internet (not shown), or the like.

Inspection support apparatus 1 is, for example, a server apparatus, and includes control section 11, operating section 12, display section 13, communication section 14, and storage section 15. The sections are connected by a bus.

Control section 11 is made up of a CPU (central processing unit), a RAM (random access memory), and the like. The CPU of control section 11 reads out various programs such as a system program and process programs stored in storage section 15, expands the programs on the RAM, and executes various processes in accordance with the expanded programs. Control section 11 functions as a production facility information acquisition section (described later), an inspector candidate information acquisition section (described later), an inspection-related information output section (described later), a past inspection information acquisition section (described later), and an inspection support information output section (described later) by executing the various processes. Control section 11, in response to a request to connect to inspection support apparatus 1 from producer terminal 2A or producer terminal 2B, determines whether to allow connection based on an ID issued for each producer and a connection password and, when a connection condition is satisfied, allows the connection. Control section 11, in response to a request to connect to inspection support apparatus 1 from inspector terminal 3A or inspector terminal 3B, determines whether to allow connection based on an ID issued for each inspector and a connection password and, when a connection condition is satisfied, allows the connection. Control section 11 also functions as an authentication section.

Operating section 12 is made up of a keyboard including character input keys, numeric input keys, and various function keys, and a pointing device, such as a mouse, and outputs a depression signal of a key depressed with the keyboard and an operating signal with a mouse to control section 11 as input signals.

Display section 13 includes, for example, a monitor, such as an LCD. Display section 13 displays various screens in accordance with instructions of display signals that are input from control section 11.

Communication section 14 is made up of, for example, a LAN card, or the like. Communication section 14, for example, sends or receives data to or from an external device connected to a communication network via a switching hub.

Storage section 15 is made up of, for example, an HDD (hard disk drive), a semiconductor nonvolatile memory, or the like. Various programs are stored in storage section 15 as described above.

Database 150 is provided in storage section 15.

Database 150 includes production facility information table 151 (which corresponds to a "first storage section" of the present invention) that stores production facility information on production facilities. Information on each production facility is stored as one record in production facility information table 151. Information on a production facility contains, for example, a location (address, latitude and longitude), an owning or managing business company (producer), the age of the facility, a facility scale (area, the type of equipment in the facility, the number of pieces of equipment, and the like), the status of operation or non-operation, the inspection time of the production facility, and an inspection record (to be added for every inspection). In the following description, past inspection time at which an inspection of a production facility has been completed is referred to as inspection time (past), and scheduled inspection time at which an inspection of a production facility is scheduled to be performed is referred to as inspection time (future). Inspection time (future) includes not only regular inspection time including legal inspection time but also desired inspection time at which a producer optionally desires an inspection of a production facility. Information on a production facility, except for an inspection record, is input via producer terminal 2 mainly by a producer and registered in database 150. A location, particularly, the position information of each individual piece of equipment in a production facility, may be registered in database 150 from map information or a past inspection record. An inspection record is input via an inspector terminal by an inspector and registered in database 150. An inspector terminal means both inspector candidate terminal 3 and inspector terminal 30 (described later). Terminals 3, 30 are the same in terms of terminals that inspection sides hold and also have the same function of an input terminal or an output terminal.

Database 150 includes inspector candidate information table 152 (which corresponds to a "second storage section" of the present invention) that stores inspector candidate information on inspector candidates. Information on each inspector candidate is stored as one record in inspector candidate information table 152. Information on an inspector candidate contains, for example, an inspection company name (the name of an inspector), a location, company information, an inspection track record, an inspection fee, available inspection time, the number of inspectors, and the ratings of inspectors. Inspectors may be inspectors of corporations different from producers or may be inspectors employed by producers (inspectors of inspection departments in corporations). Information on inspector candidates, except for ratings, is input via inspector terminals 3 mainly by inspectors and registered in database 150. Input of a rating of an inspector is allowed by a producer, for example, after a report on inspection results is received. Evaluation items in rating include whether an inspection has been performed in accordance with an inspection plan, whether there is any mistake, omission, or the like, in inspection, whether images during inspection have been captured without any problem, and the like. In addition, control section 11 may automatically calculate a time taken for inspection, extract a found gas leak and its repair result, and extract the number of inspections of an inspector from inspection data (including data from the GPS, or the like, of a camera, and video data) that are uploaded from the inspector, and then add them to the rating of the inspector. By assigning weights to these evaluation items, control section 11 may calculate a rating value based on a predetermined calculation expression and use the rating value as a rating.

Database 150 also includes producer information table 153 (which corresponds to a "third storage section" of the present invention) that stores producer information on producers. Information on each producer is stored as one record in producer information table 153. Information on a producer contains a business company name, an address, contact information, and company information. Producer information is input via producer terminal 2 mainly by a producer and registered in database 150.

Database 150 also includes inspection-related information table 154 (which corresponds to a "fourth storage section" of the present invention) that stores inspection-related information on inspections. Information on each inspection is stored as one record in inspection-related information table 154. Information on an inspection contains information on an inspection plan (which corresponds to "inspection schedule information" of the present invention), information on an inspection of a production facility, and information for the inspection of the production facility (inspection support information).

Information on an inspection plan contains, for example, an inspector, inspection time (future), a production facility(s), an inspection schedule, and an inspection route (the order of production facilities to be inspected, and the order of individual pieces of equipment to be inspected in each production facility). Information on an inspection plan may contain information for an inspection (inspection support information).

Information on an inspection of a production facility(s) contains, for example, information on a subject of inspection, information on settings of an inspection instrument, and information on an image capture environment. Information on a subject of inspection contains, for example, a production facility serving as a subject of inspection, inspection locations (valves, pipe positions) in the production facility, whether there is a gas leak in the past, video data when captured with an infrared camera in the past, and the like. Information on these subjects of inspection is also inspection data. Inspection data contains, for example, the file name of video data, the storage location of the video data, an update date, file size, and the like. Video data is stored in, for example, storage section 15. Information on the settings of an inspection instrument contains, for example, image capture point positions, image capture directions, image capture conditions (light exposure, gain, focus, sensor temperature, and the like), and the like. Information on an image capture environment contains, for example, weather, air temperature, humidity, wind velocity, atmospheric pressure, and the like, image capture date and time, and the like. These pieces of information on an image capture environment are also inspection data. These pieces of inspection data are input via an inspector terminal by an inspector and registered in database 150.

Information for an inspection of a production facility (inspection support information) contains, for example, priority inspection locations for inspection, inspection subject-related information on a production facility, information on the settings of an inspection instrument, inspection data in the past, and the like. Inspection subject-related information on a production facility contains, for example, a list of inspection locations in the production facility that is a subject of inspection, and a map of the production facility from which the inspection locations are found. Information on the settings of an inspection instrument contains, for example, the image capture point positions and image capture directions of a camera for a subject of inspection.

Database 150 also includes report format-related information table 155 that stores report format-related information on a report format. Information on each report format is stored as one record in report format-related information table 155. Information on a report format stores formats for inputting items required to describe the formats of a legal report, inspection report, and repair report.

When production facility information from producer terminal 2 is received by communication section 14, control section 11 stores the production facility information in production facility information table 151. When inspector candidate information from inspector candidate terminal 3 is received by communication section 14, control section 11 stores the inspector candidate information in inspector candidate information table 152. When producer information from producer terminal 2 is received by communication section 14, control section 11 stores the producer information in producer information table 153.

Control section 11 functions as the inspector candidate information acquisition section. In other words, control section 11 acquires inspector candidate information from inspector candidate information table 152. Control section 11 also functions as the production facility information acquisition section. In other words, control section 11 acquires production facility information from production facility information table 151. Then, control section 11 extracts a record(s) of which available inspection time coincides with the inspection time (future) of a production facility. In other words, control section 11 functions as the inspection-related information output section that selects inspector candidate(s) that satisfies/satisfy a condition that the available inspection time coincides with the inspection time from among a plurality of inspector candidates as an inspector(s) that makes/make an inspection of the production facility. The "coincidence" means that available inspection time and inspection time overlap each other at least in a time required for inspection.

For example, a plurality of records may be extracted from inspector candidate information table 152. That is, a plurality of inspector candidates may be selected. In this case, control section 11 may preferentially select an inspector candidate of which a distance to a production facility is near as an inspector. A distance to a production facility is, for example, obtained from the site of a production facility as production facility-related information and the address of an inspector candidate as inspector candidate information. In this case, since a production facility of which the above-described inspector candidate performs an inspection is near, time and cost that are required for travel are reduced, so the time and cost efficiency of inspection is increased.

For example, an inspection of each of a plurality of production facilities that are managed by the same producer may be performed. In this case, control section 11 may select the same inspector candidate as an inspector that performs an inspection of a plurality of production facilities that are managed by the same producer. Thus, by collectively making an inspection plan in which an inspection of a plurality of production facilities within a certain distance at the same inspection time, the efficiency of inspection is increased.

Not limited to this configuration, control section 11 may select the same inspector candidate as an inspector for an inspection of a plurality of production facilities that are managed by different producers. Thus, it is possible to make an inspection plan in which the same inspector is able to perform an inspection of a plurality of production facilities. When producers individually make a request for inspection, it is difficult to make the above-described inspection plan. In this case, by making the above-described inspection plan, an inspector is able to keep jobs and is also able to efficiently perform an inspection of a plurality of production facilities. In addition, a situation in which a schedule of an inspector is occupied by a small number of producers is avoided.

An inspection may be not performed as planned for an inspection plan output by control section 11. This is, for example, when repair work for gas leak takes time unexpectedly and an inspection has not completed, when a traffic trouble, or the like, has occurred during travel, when a producer or an inspector suddenly becomes inconvenient, or the like. In such cases as well, control section 11 is able to make an inspection plan again in consideration of inspection time available for an inspector based on the inspector candidate information stored in database 150.

Control section 11 may preferentially select an inspector candidate having a high rating as an inspector. Thus, a highly capable inspector is sent for inspection, so a producer is able to maintain the quality of inspection. An inspector is able to do a job appropriate for the skill and is able to raise motivation for jobs by receiving an appropriate rating. A rating (inspection track record) is obtained based on information on an inspector candidate, stored in the inspector candidate information table 152 as a record.

Control section 11 may select an inspector based on information on the inspection capability of an inspector candidate. Information on the inspection capability of an inspector candidate is, for example, the number of inspections of an inspector candidate or the number of years an inspector candidate is engaged in inspection. The number of inspections of an inspector candidate or the number of years an inspector candidate is engaged in inspection may be regarded as the inspection experience of an inspector candidate. Control section 11 may preferentially select an inspector candidate having much inspection experience as an inspector. If an inspector candidate having less inspection experience is selected, an inspection plan may be made by estimating a longer time that is taken for the inspector candidate having less inspection experience to perform one inspection. Alternatively, control section 11 may preferentially select an inspector candidate having experience in inspecting a production facility that is a subject of inspection in the past as an inspector. Alternatively, control section 11 may choose an inspector based on the scale of a production facility and the number of inspections of an inspector candidate, which is appropriate for the scale. For example, control section 11 may select an inspector candidate having rich experience with a large number of inspections as an inspector when the scale of a production facility is large, and may select an inspector candidate having less experience as an inspector when the scale of a production facility is small. For a large-scale production facility, since there are many inspection locations, an inspection needs to be efficiently performed. In such a case, by selecting an inspector candidate having rich experience, an inspection is efficiently performed without a delay from an inspection plan. For education of an inspector, an inspector candidate having less experience may be selected.

Alternatively, control section 11 may preferentially select an inspector that charges an inexpensive inspection fee. Thus, a burden on a producer is reduced.

As described above, control section 11 preferably outputs information on an inspection plan in consideration of at least one of the place of a production facility, the address of an inspector candidate, the rating of an inspector candidate, information on the inspection capability of an inspector candidate, and an inspection fee. When an inspector candidate is selected by using a plurality of items (conditions), the order of priority may be assigned to each item. For example, when a distance to a production facility is set for a first priority item and the number of inspections is set for a second priority item, an inspector candidate(s) within a predetermined distance is/are selected, and an inspector candidate having the greatest number of inspections is selected from among the selected inspector candidate(s).

An inspector candidate may be selected by assigning weights to each item and ranking inspector candidates based on a total rating value. In this case, a plurality of ranks is set for each item. For example, five points are assigned when the distance is near, and a rank value is changed like four points, . . . , one point as the distance extends. Ranking is performed by setting the order of priority of each item as weights (relatively large weights are assigned to an item having a higher order of priority) and calculating the sum total of values obtained by multiplying rank values by the weights.

Control section 11 also has the function of the inspection-related information output section for outputting inspection-related information containing the selected inspector. Specifically, control section 11 controls communication section 14 such that communication section 14 sends an inspection plan for a production facility to producer terminal 2 and inspector candidate terminal 3. An inspection plan contains an inspector, inspection time, and a production facility serving as a subject of inspection.

Producer terminal 2 is, for example, a personal computer. Producer terminal 2, as shown in FIG. 1, includes control section 21, operating section 22, display section 23, communication section 24, and storage section 25. The sections are connected by a bus.

Control section 21 is made up of a CPU, a RAM, and the like. The CPU of control section 21 reads out various programs such as a system program and process programs stored in storage section 25, expands the programs on the RAM, and executes various processes in accordance with the expanded programs.

Control section 21 controls communication section 24 such that communication section 24 sends producer information and production facility information to inspection support apparatus 1. Control section 21 also controls communication section 24 such that communication section 24 receives an inspection plan, video data, inspection data (containing information on a subject of inspection and information on an image capture environment), and a legal report (described later) from inspection support apparatus 1. Thus, a producer is able to check a scheduled inspection of a production facility and an inspected result.

Operating section 22 is made up of a keyboard including character input keys, numeric input keys, and various function keys, and a pointing device, such as a mouse, and outputs a depression signal of a key depressed with the keyboard and an operating signal with a mouse to control section 21 as input signals.

Display section 23 includes, for example, a monitor, such as an LCD. Display section 23 displays various screens in accordance with instructions of display signals that are input from control section 21.

Communication section 24 is made up of, for example, a LAN card, or the like. Communication section 24, for example, sends or receives data to or from an external device connected to a communication network via a switching hub.

Storage section 25 is made up of, for example, an HDD (hard disk drive), a semiconductor nonvolatile memory, or the like. A system program, a web browser, and the like, are stored in storage section 25 as described above.

Inspector candidate terminal 3 is, for example, a personal computer. Inspector candidate terminal 3, as shown in FIG. 1, includes control section 31, operating section 32, display section 33, communication section 34, and storage section 35. The sections are connected by a bus.

Control section 31 is made up of a CPU, a RAM, and the like. The CPU of control section 31 reads out various programs such as a system program and process programs stored in storage section 35, expands the programs on the RAM, and executes various processes in accordance with the expanded programs.

Control section 31 controls communication section 34 such that communication section 34 sends inspector candidate information to inspection support apparatus 1. Control section 31 also controls communication section 34 such that communication section 34 receives inspection-related information containing an inspection plan from inspection support apparatus 1. Thus, a producer is able to check a scheduled inspection of a production facility.

Operating section 32 is made up of a keyboard including character input keys, numeric input keys, and various function keys, and a pointing device, such as a mouse, and outputs a depression signal of a key depressed with the keyboard and an operating signal with a mouse to control section 31 as input signals.

Display section 33 includes, for example, a monitor, such as an LCD. Display section 33 displays various screens in accordance with instructions of display signals that are input from control section 31.

Communication section 34 is made up of, for example, a LAN card, or the like. Communication section 34, for example, sends or receives data to or from an external device connected to a communication network via a switching hub.

Storage section 35 is made up of, for example, an HDD (hard disk drive), a semiconductor nonvolatile memory, or the like. A system program, a web browser, and the like, are stored in storage section 35 as described above.

With the above-described configuration, control section 11 selects an inspector candidate that satisfies a certain condition from among a plurality of inspector candidates as an inspector that performs an inspection of a production facility. Thus, an inspection plan (including an inspector) is made. The efficiency of inspection is increased by performing an inspection in accordance with an inspection plan.

Figure 2:
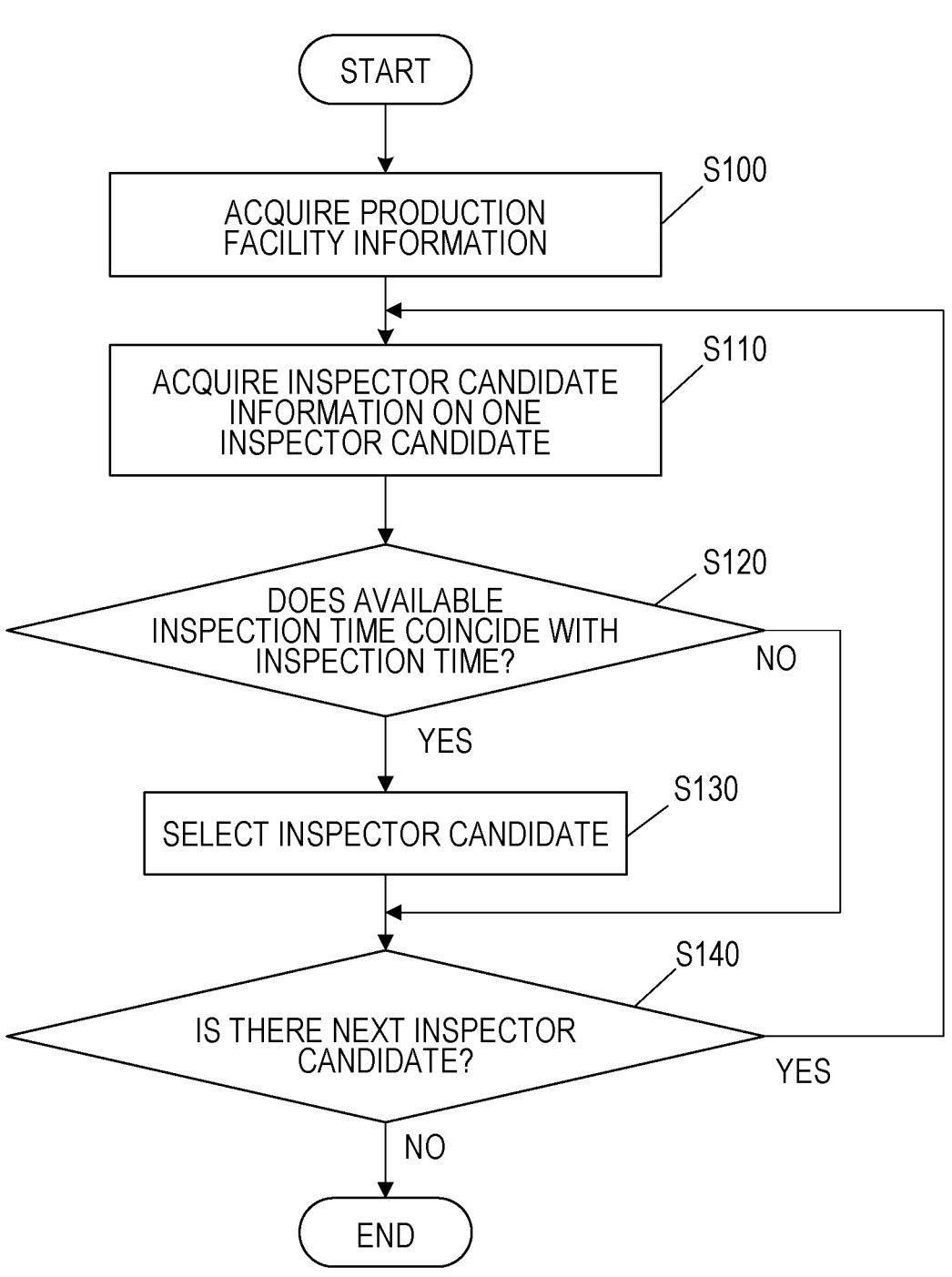
FIG. 2 is a flowchart showing an example of a process of selecting an inspector that performs an inspection of a production facility.

Next, a process of selecting an inspector that performs an inspection of a production facility will be described with reference to FIG. 2. FIG. 2 is a flowchart showing an example of the process of selecting an inspector that performs an inspection of a production facility. This flow is started, for example, by running a program for creating an inspection plan.

Initially, in step S100, control section 11 acquires production facility information from database 150.

Subsequently, in step S110, control section 11 acquires inspector candidate information on one inspector candidate from database 150.

Subsequently, in step 5120, control section 11 determines whether inspection time (future) in the production facility information coincides with available inspection time in the inspector candidate information. As a result of the determination, when the inspection time coincides with the available inspection time (YES in step S120), the process proceeds to step S130. On the other hand, when the inspection time does not coincide with the available inspection time (NO in step S120), the process proceeds to step S140.

In step 5130, control section 11 selects the inspector candidate that satisfies the condition that the inspection time coincides with the available inspection time as an inspector.

Subsequently, in step 5140, control section 11 determines whether there is the next inspector candidate. As a result of the determination, when there is the next inspector candidate (YES in step S140), the process returns to the upstream of step 5110. On the other hand, when there is no next inspector candidate (NO in step S140), the process ends.

With inspection support apparatus 1 according to the above-described embodiment, control section 11 executes control to acquire production facility information on a production facility, acquire inspector candidate information on an inspector candidate that is a candidate that performs an inspection of the production facility, and output inspection-related information containing inspection schedule information on a schedule of inspection of the production facility by the inspector candidate based on the acquired production facility information and inspector candidate information. Thus, it is possible to efficiently make an inspection plan for a production facility. As a result, an inspector is able to efficiently perform an inspection of a production facility.

With the inspection support apparatus 1 according to the above-described embodiment, control section 11 selects an inspector from among a plurality of inspector candidates by combining two or more functions of an inspection schedule output section that selects an inspector from among a plurality of inspector candidates. Thus, it is possible to select an inspector appropriate for requests respectively from a producer and an inspector.

In the above-described embodiment, an inspector of a corporation (inspection company) different from a producer is selected as an inspector that performs an inspection of a production facility; however, the present invention is not limited thereto. For example, an inspector employed by a producer may be selected. In this case, a producer inputs information and acquires output information via producer terminal 2 and inspector candidate terminal 3. Producer terminal 2 and inspector candidate terminal 3 may be the same terminal. An inspector employed by a producer may be selected to be dispatched for an inspection of a production facility of another producer.

In the above-described embodiment, communication among producer terminal 2, inspector candidate terminal 3, and inspection support apparatus 1 is performed via the Internet; however, the present invention is not limited thereto. For example, for relatively near communication, communication among producer terminal 2, inspector candidate terminal 3, and inspection support apparatus 1 may be performed in accordance with a communication mode, for example, Wi-fi (wireless fidelity), NFC (near field communication), Bluetooth (registered trademark), or the like.

First Modification

Next, inspection support apparatus 1 according to modifications of the present embodiment will be described. In the description of inspection support apparatus 1 according to the modifications, components different from those of the above-described embodiment will be mainly described, like reference numerals denote the same components, and the description thereof is omitted.

Figure 3:
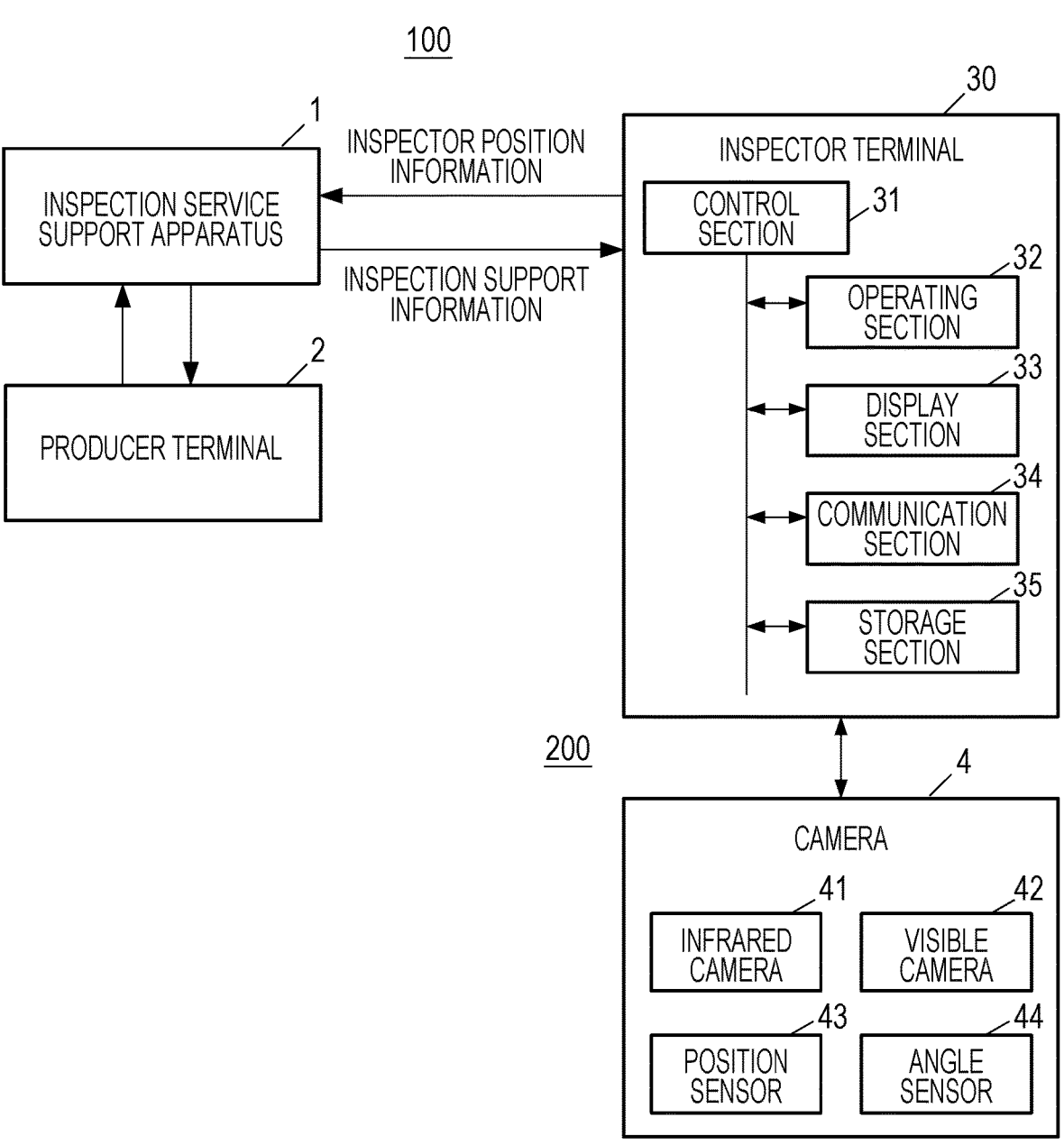
FIG. 3 is a block diagram showing the configuration of an inspection support system according to a first modification.
Figure 4:
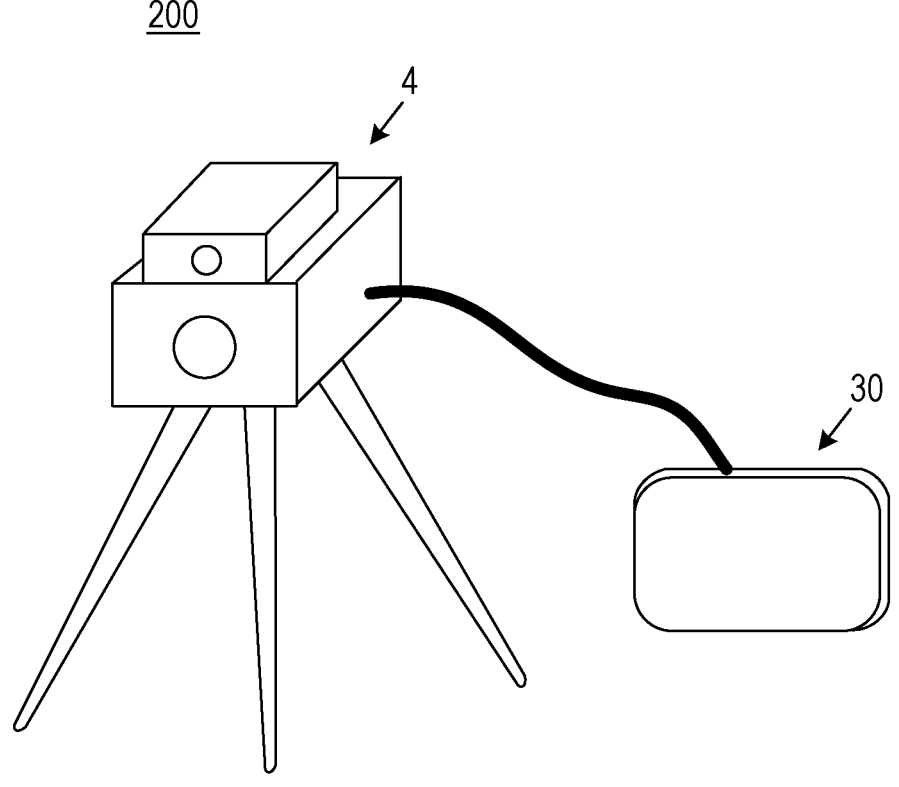
FIG. 4 is an appearance view schematically showing the configuration of the inspection support system according to the first modification.

Inspection support apparatus 1 according to the first modification will be described with reference to FIG. 3 to FIG. 5B. FIG. 3 is a block diagram showing the configuration of inspection support system 100 according to the first modification. FIG. 4 is an appearance view schematically showing the configuration of inspection support system 100 according to the first modification.

Inspection support system 100 shown in FIG. 3 includes inspection support apparatus 1, producer terminal 2, inspector terminal 30, and camera 4. Inspector terminal 30 may be the same terminal as inspector candidate terminal 3 or may be a terminal different from inspector candidate terminal 3. In the case of the first modification, as shown in FIG. 4, inspector terminal 30 is realized by a tablet display terminal. Hereinafter, a system including inspector terminal 30, camera 4, and a cable connecting these is referred to as gas monitoring system 200. The CPU of control section 31 reads out a gas processing program stored in storage section 35, expands the program on the RAM, and executes various processes in accordance with the expanded program.

Camera 4 includes infrared camera 41, visible camera 42, position sensor 43, and angle sensor 44.

Infrared camera 41 obtains a captured image (infrared image) in which leak gas is visualized. Since the configuration of infrared camera 41 that is able to visualize gas is known, the description is omitted here. Visible camera 42 obtains a general captured image (visible image) by imaging visible light.

Position sensor 43 is realized by a GPS sensor. Angle sensor 44 is realized by an acceleration sensor. Since camera 4 includes angle sensor 44, camera 4 is able to obtain information of an image capture direction in which camera 4 is imaging. A sensor other than a GPS sensor may be used as position sensor 43, and a sensor other than an acceleration sensor may be used as angle sensor 44. In short, these sensors just need to be able to obtain the image capture point positions and image capture directions of camera 4.

Control section 31 of inspector terminal 30 has the function of an image processing section that forms an image easy for an inspector to identify a gas leak location by applying image processing to captured images obtained by infrared camera 41 and visible camera 42. For example, control section 31 (image processing section) forms a thermal distribution image (temperature information) based on a captured image from infrared camera 41 and extracts a part looking like gas outflow from the image. In addition, control section 31 superimposes the gas outflow image (also referred to as gas image) on a captured image obtained by visible camera 42. In this way, control section 31 forms an image easy to see where a gas leak is occurring. The configuration described here is an example of image processing by control section 31 (image processing section), and the present invention is not limited thereto. Control section 31 has the function of a display control section that causes display section 33 to display an image subjected to image processing.

An image subjected to image processing by control section 31 is input to storage section 35. A captured image from camera 4 is also input to storage section 35. In addition, position information and an image capture direction, obtained by camera 4, are input to storage section 35.

Furthermore, the position information obtained from camera 4 is sent to inspection support apparatus 1 via communication section 34.

Figure 5A:
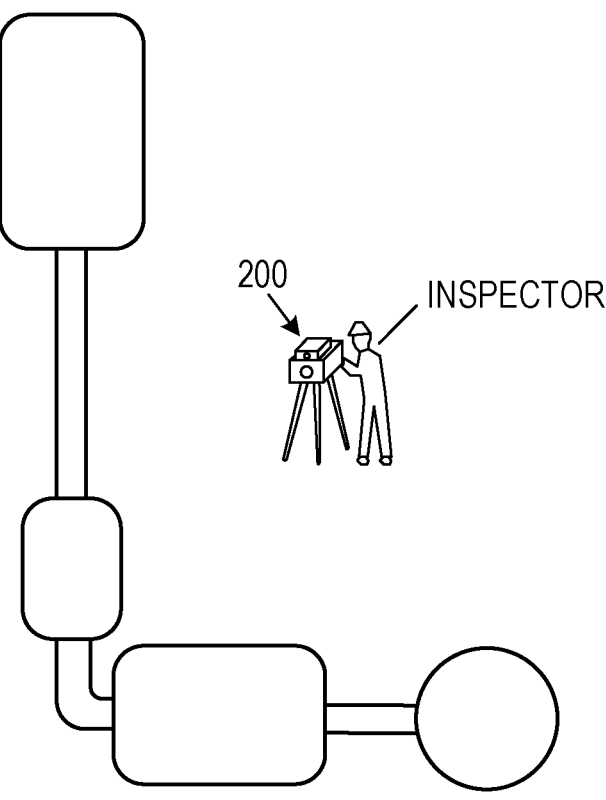
FIG. 5A is a view showing an example of a case where a production facility and an inspector are displayed on a map.

FIG. 5A is a view showing an example of a case where a production facility and an inspector are displayed on a map. FIG. 5A simply shows buildings and pipes in a production facility. As shown in FIG. 5A, control section 31 causes display section 33 of inspector terminal 3 to display a map containing a production facility that is a subject of inspection and to display the position of an inspector on the map based on the position information of the inspector, acquired from position sensor 43.

When a map is displayed, the position information of each individual piece of equipment in a production facility is required; however, not all the position information of each individual piece of equipment is grasped and input by a producer. Therefore, detailed position information (latitude and longitude) of each of pieces of equipment, such as buildings and pipes, is acquired from map information and stored in database 150. The position information of a piece of equipment can be acquired from an image captured in a past inspection, position information of an inspector, and image capture data (azimuth data, viewing angle, and the like) of the camera.

Control section 11 (see FIG. 1) of inspection support apparatus 1 determines whether an inspection of a production facility has been performed in the past (whether an inspection is performed again) based on the production facility information and inspector candidate information stored in database 150. Control section 11 has the function of the past inspection information acquisition section that acquires past inspection data.

Control section 11 also has the function of an identification section that identifies whether a production facility is a production facility to be inspected by an inspector in the nearest future based on the position information of the inspector (position information obtained from camera 4) and the position information of the production facility (position information stored in production facility information table 151 or position information extracted from past inspection data (position information from GPS, or the like).

When control section 11 (output control execution section) determines that an inspection of a production facility is performed again and identifies that the production facility is a production facility to be inspected by an inspector in the nearest future, control section 11 executes control for outputting inspection support information for supporting an inspection of the production facility (the function of the inspection support information output section). Thus, inspector support information is sent to inspector terminal 30, and inspector terminal 30 acquires the inspector support information. Here, inspection support information contains, for example, information on priority check locations for an inspection of a production facility (for example, information on past gas leak locations and locations susceptible to gas leak), information on a production facility, information on the settings of an inspection instrument, and past inspection data for the production facility (specifically, the image capture point positions and image capture directions of camera 4, and video data).

Control section 31 (display control section) generates a guidance image that guides an inspector such that the current image capture point position and image capture direction of camera 4 match the past image capture point position and image capture direction, and causes display section 33 (see FIG. 3) to display the guidance image. Here, a past image, a message, a symbol, or the like, may be displayed as the guidance image or the guidance image may be displayed in map.

Figure 5B:
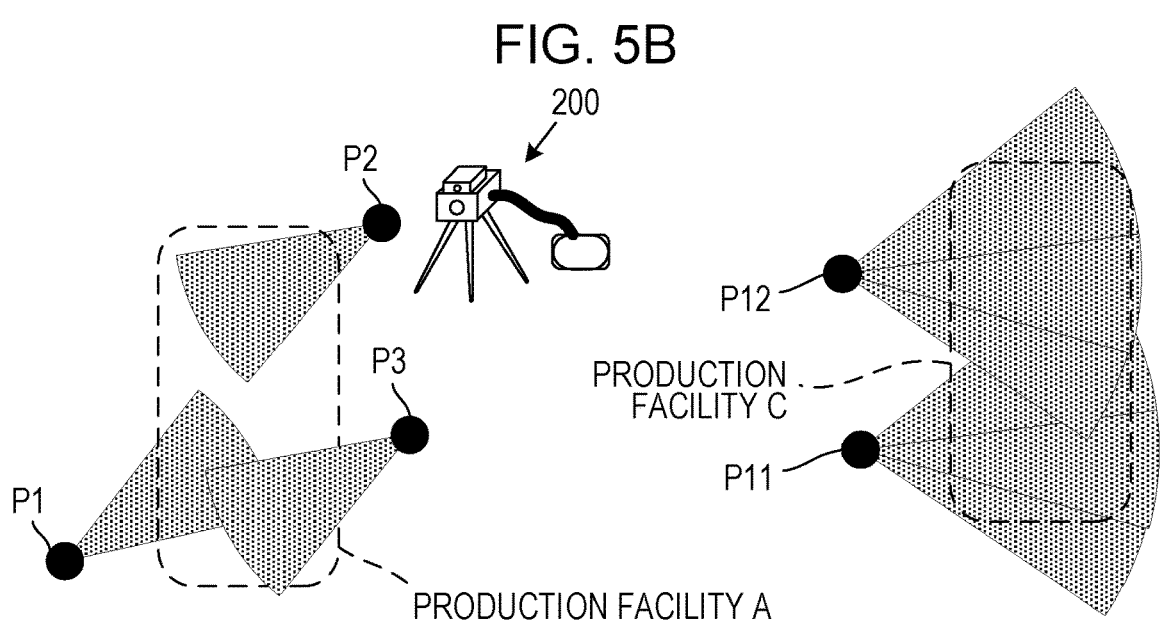
FIG. 5B is a view showing image capture point positions and image capture directions in an area in which a plurality of production facilities is arranged.
Figure 5B:
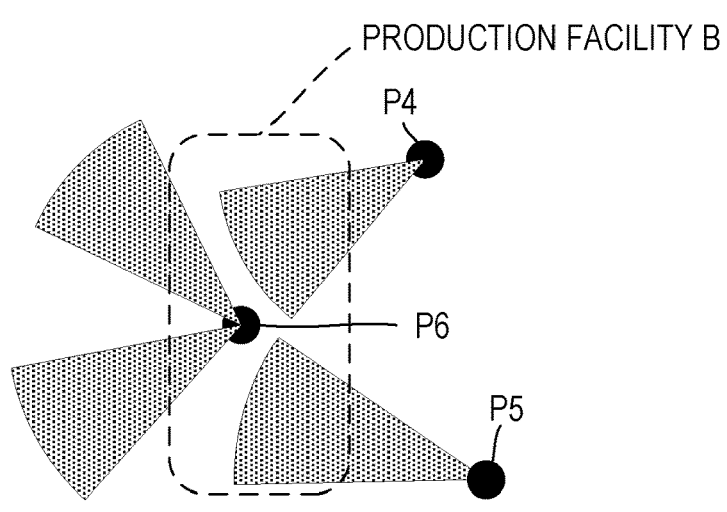
Figure 5B:
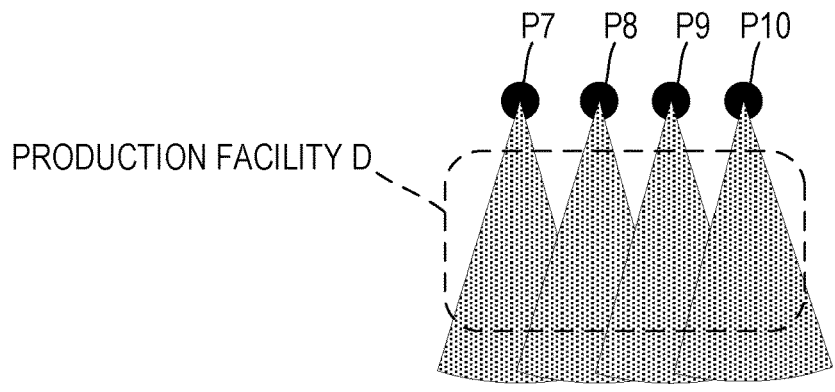

Next, a guidance image will be described with reference to FIG. 5B. FIG. 5B is a view showing image capture point positions and image capture directions in an area in which a plurality of production facilities is arranged. In the example of FIG. 5B, production facility A, production facility B, production facility C, and production facility D are arranged in the area. An inspector moves with gas monitoring system 200 and captures imaging subjects by orienting camera 4 in the image capture directions indicated by the sector forms in the drawing at image capture points P1 to P12 in the drawing. These image capture points P1 to P12 and image capture directions are determined in advance in consideration of locations where a gas leak is easy to occur, important locations, efficient inspection order, and the like. The inspector captures imaging subjects at the image capture point positions while making the rounds in order of image capture points P1→P2→P3→ . . . →P10→P11→P12.

For example, when the inspector approaches image capture point P1 with gas monitoring system 200, the message "NEAR IMAGE CAPTURE POINT P1 (PRODUCTION FACILITY A)" is displayed on display section 33 (see FIG. 3). Thus, the inspector recognizes that camera 4 is located near image capture point P1. Subsequently, when the difference between the position of the inspector and the image capture point position is substantially zero, the message "AT IMAGE CAPTURE POINT P1 (PRODUCTION FACILITY A)" is displayed on display section 33. Thus, the inspector recognizes that camera 4 is arranged at image capture point P1.

In the case of the first modification, a present image and a past image are displayed on display section 33. A present image is an image being captured by camera 4 at present. A past image is a captured image stored in inspection-related information table 154 of inspection support apparatus 1 as past inspection data and sent from inspection support apparatus 1 to camera 4. A past image may be an image captured during the last rounds or may be an image captured during the initial rounds or may be an image selected by an inspector from among past images. A past image may be automatically displayed or may be displayed in response to an inspector's instruction operation.

Figure 6:
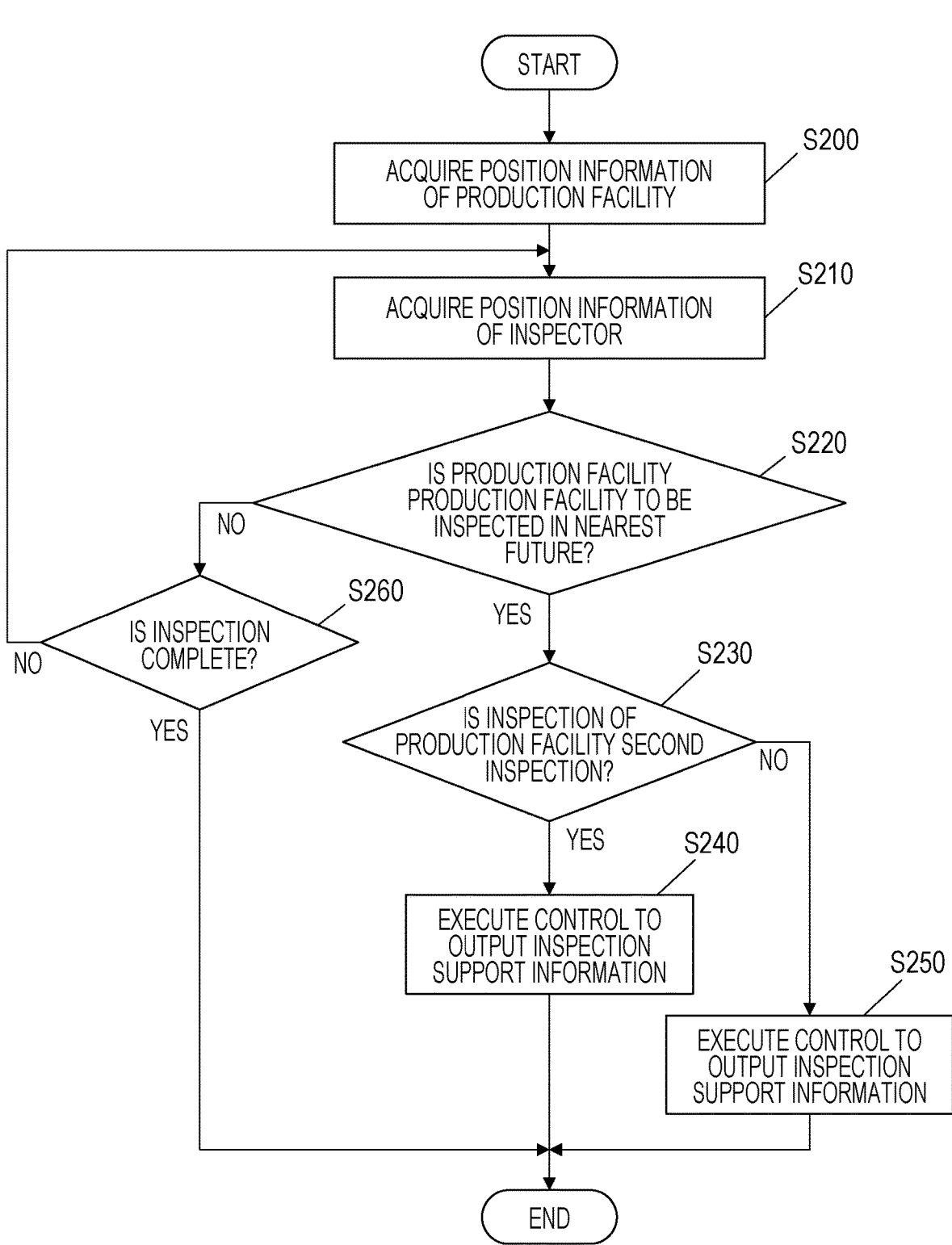
FIG. 6 is a flowchart showing an example of a process of outputting inspection support information for a production facility.

Next, a process of outputting inspection support information for a production facility will be described. FIG. 6 is a flowchart showing an example of the process of outputting inspection support information for a production facility. This flow is started, for example, by running a program for acquiring inspection support information. For example, by giving inspection support information to an inspector at the start of rounds, the efficiency of inspection is increased.

Initially, in advance of step 200, when the ID and connection password of an inspector are input to inspector terminal 30, control section 11 allows connection between inspector terminal 30 and inspection support apparatus 1, and connection between inspector terminal 30 and inspection support apparatus 1 is established.

In step 5200, control section 11 acquires the position information of the production facility.

Subsequently, in step 5210, control section 11 acquires the position information of the inspector.

Subsequently, in step 5220, control section 11 determines whether the production facility is a production facility to be inspected by the inspector in the nearest future. Specifically, when the position of the inspector is located within a predetermined range from the position of the production facility to be inspected, the production facility is determined as a production facility to be inspected in the nearest future. As a result of the determination, when the production facility is a production facility to be inspected by the inspector in the nearest future (YES in step S220), the process proceeds to step 5230. On the other hand, when the production facility is not a production facility to be inspected by the inspector in the nearest future (NO in step S220), the process proceeds to step 5260.

In step 5230, control section 11 determines whether the inspection of the production facility is a second inspection. Specifically, when past inspection data is stored in database 150, it is determined as a second inspection. As a result of the determination, when the inspection of the production facility is a second inspection (YES in step S230), the process proceeds to step 5240. On the other hand, when the inspection of the production facility is not a second inspection (NO in step S230), the process proceeds to step 5250.

In step 5240, control section 11 executes control to output inspection support information. After that, the process in FIG. 6 ends.

In step 5250, control section 11 executes control to output inspection support information. After that, the process in FIG. 6 ends. Inspection support information to be output varies between in the case of a second inspection (YES in step 5230) and in the case of not a second inspection (NO in step S230). As inspection support information in the case of not a second inspection, the position of the inspector may be displayed on a production facility map as shown in FIG. 5B, or the positions of subjects of inspection on the map, an inspection route indicating the order of inspection of the subjects of inspection, or the like, may be displayed. Thus, an inspection is supported. By outputting inspection support information for a facility to be inspected in the nearest future, improvement in inspection efficiency and improvement in the quality of inspection are achieved. On that basis, as inspection support information in the case of a second inspection, a past inspection image may be displayed next to a present inspection image, and past image capture points and conditions may be provided. Thus, improvement in inspection efficiency and improvement in inspection accuracy are achieved. As inspection support information in the case of a second inspection, inspection support information containing past inspection information is output, so inspection efficiency is further improved, and the quality of inspection is further improved.

In step 5260, control section 11 determines whether the inspection is complete. As a result of the determination, when the inspection is complete (YES in step S260), the process in FIG. 6 ends. On the other hand, when the inspection is not complete (NO in step S260), the process returns to the upstream of step 5210.

With the inspection support apparatus 1 in the first modification, inspection-related information table 154 that stores inspection-related information containing inspection support information for supporting an inspection of a production facility is provided. When an inspection of a production facility is performed again and the production facility is a production facility to be inspected by the inspector in the nearest future, control for outputting inspection support information for the production facility is executed. Thus, the quality of inspection of the production facility increases and an inspection is easy to be performed, so the efficiency of inspection of the production facility is increased.

In the first modification, camera setting conditions during a past inspection may be displayed. Thus, imaging under the same conditions becomes easy.

In the first modification, whether there is a gas leak in the past or a location where a gas leak has been detected may be displayed on display section 33. Thus, a location where a gas leak has occurred in the past can be intensively inspected, so the quality of inspection is increased.

In the first modification, inspector terminal 30 is the terminal that makes up gas monitoring system 200. Inspector terminal 30 is not limited to a tablet display terminal (tablet terminal) and may be, for example, a personal computer (portable type), a mobile type, such as a mobile device (such as a smartphone and a touch pad), or a portable-type terminal. With these devices as well, at least part of the inspector terminal 30 can be easily made up by a CPU (central processing unit), a RAM (random access memory), a ROM (read only memory), an HDD (hard disk drive), an SSD (solid state drive), and the like. The CPU reads out a gas processing program stored in the ROM, or the like, expands the program on the RAM, and runs the program, thus implementing the functions of the sections.

In gas monitoring system 200, camera 4 and inspector terminal 30 are connected by the cable. Alternatively, camera 4 and inspector terminal 30 may be connected wirelessly or camera 4 and inspector terminal 30 may be integrated. In this case, camera 4, inspector terminal 30, and gas monitoring system 200 are the same device.

In the flowchart of FIG. 6, the process of step 5220, step 5230, step 5240, and step 5250 is executed by control section 11 of inspection support apparatus 1. Alternatively, the process may be executed by control section 31 of inspector terminal 30. In this case, inspector terminal 30 issues a request to output information stored in database 150 to inspection support apparatus 1, inspector terminal 30 receives output information, and control section 31 executes the process of steps based on the output information.

Second Modification

Figure 7:
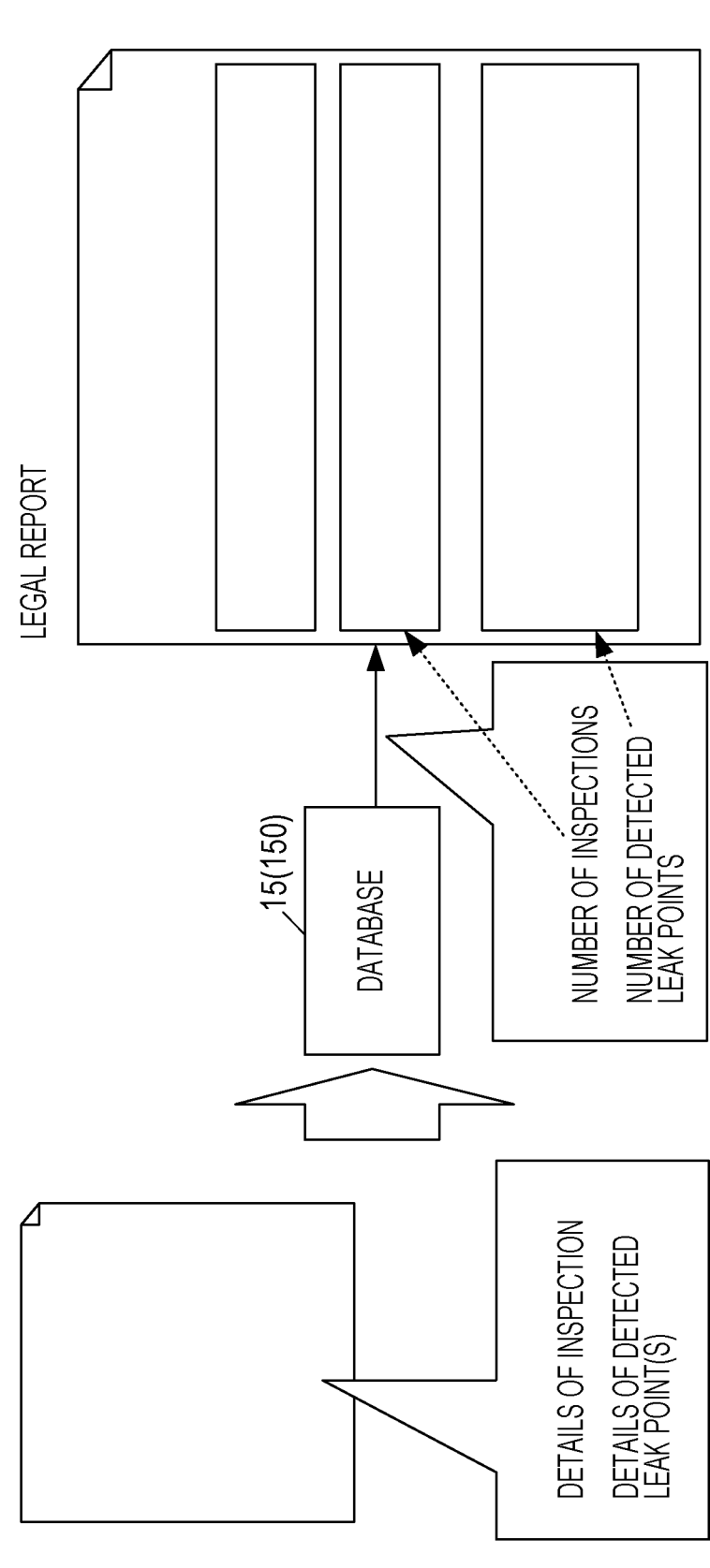
FIG. 7 is a view illustrating an example of a process of creating an inspection record from results of an inspection of a production facility.

Next, inspection support apparatus 1 according to a second modification will be described with reference to FIG. 7. FIG. 7 is a view illustrating an example of a process of creating an inspection record from results of an inspection of a production facility. Here, description will be made on the assumption that a legal report is an example of an inspection record. The process is executed after results of an inspection of a production facility are stored in inspection-related information table 154 via inspector terminal 30.

Control section 11 extracts an inspection record format for inputting items required for an inspection record from report format-related information table 155. Control section 11 has the function of an inspection record creating section that creates a legal report by extracting details corresponding to items (the number of inspections, and the number of detected leak points) of the inspection record format from the results of inspection (details of inspection and details of detected leak points) of the production facility, stored in inspection-related information table 154, and copying the details to the inspection record format.

With inspection support apparatus 1 according to the above-described second modification, a time that is taken to create a legal report, or the like, is shortened, so the efficiency of inspection is increased accordingly.

In the above-described second modification, a legal report is used as an example of an inspection record; however, the inspection record is not limited thereto. For example, an inspection report in which inspection situation information indicating a gas leak inspection situation is recorded or a repair report in which repair situation information indicating a gas leak repair situation is recorded may be used. Control section 11 is able to create these inspection reports, as well as a legal report, by extracting details corresponding to the items of an inspection record format from inspection results (including repair results) of a production facility, stored in inspection-related information table 154, and copying the details to the inspection record format. A time that is taken to create an inspection report, and the like, is shortened, so the efficiency of inspection is increased.

An inspection report in which inspection situation information indicating a gas leak inspection situation is recorded may be displayed in map on producer terminal 2 except in document or in list form. For a report on a repair situation, when a repair expiration date is approaching in a situation in which repair has not been made, a producer may be notified or an alarm such as highlighting, such as blinking, may be output in map. An example of the case of map display will be described. A producer inputs identification information (ID) and a password to producer terminal 2 and connects to (logs into) inspection support apparatus 1. When the producer issues a request for inspection situation information to inspection support apparatus 1, control section 11 of inspection support apparatus 1 extracts the production facility information of the producer, corresponding to the ID, from the production facility information stored in database 150 of storage section 15. As displayed in map, the map is able to display inspection and repair situations for each region by selecting a site, for each production facility by selecting a facility, and for each piece of equipment (component) in a production facility by selecting a piece of equipment. Control section 11 may acquire a map corresponding to the position of a production facility requested to be displayed from database 150 and display the production facility on the acquired map in a superimposed manner as, for example, an icon. Control section 11 may acquire requested inspection information of a production facility from inspection-related information table 154 of database 150 and display an icon by coloring according to an inspection situation and a repair situation.

FIG. 8 is a view showing an example of an inspection report displayed in map. As shown in FIG. 8, for example, a facility from which a gas leak has been found but repaired is displayed by green (indicated by vertical stripe hatching in FIG. 8), a facility from which a gas leak has been found and not repaired is displayed by red (indicated by horizontal stripe hatching in FIG. 8), and a facility that has been inspected and from which no gas leak has been found is displayed by gray (grid hatching in FIG. 8). A facility of which a repair expiration date is approaching is displayed with highlight.

Figure 9:
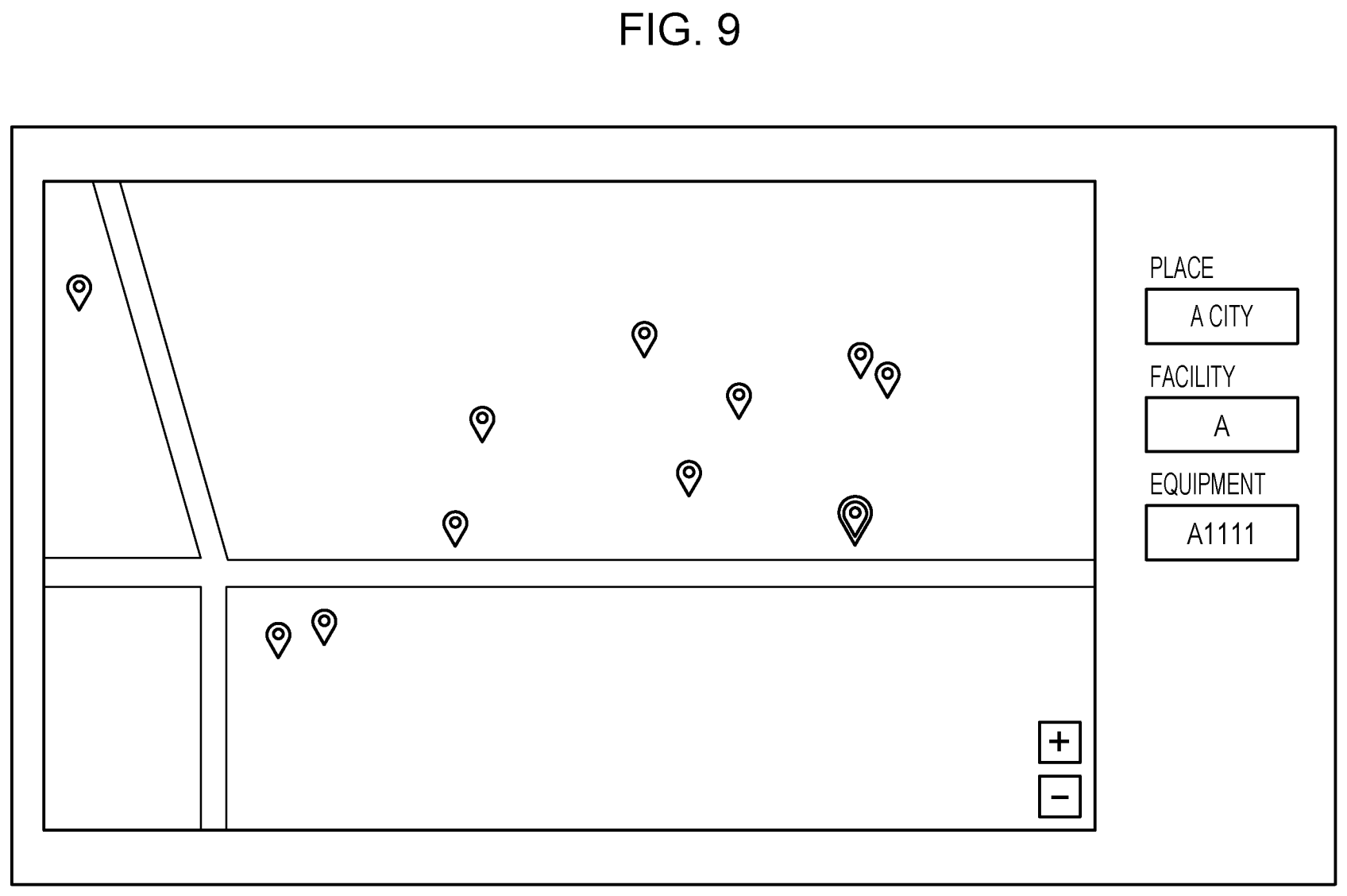

Control section 11 performs zoom display or reduced display through a mouse operation or a pinch operation, or the like, on a display screen. When a facility highlighted on the map (the facility surrounded by the blue frame in FIG. 8) is displayed in a magnified view by control section 11, a repair situation is displayed equipment (component) by equipment (component). FIG. 9 shows a plurality of pieces of equipment displayed in a magnified view on a display screen. FIG. 9 also shows "A" input to the facility item, and "A1111" input to the equipment item. When "A1111" is input to the equipment item, a gas leak and repair condition on the equipment "A1111" is listed separately and output (not shown).

Third Modification

Inspection time (inspection interval) of a production facility is determined by the law, and inspection omission needs to be prevented. When an inspection is actually performed, a sufficient preparation period is needed for a producer side or an inspector side. Therefore, for a producer side and, in addition, for an inspector side as well, inspection time is desirably informed at appropriate timing. Then, inspection support apparatus 1 may have the function of being able to automatically make an inspection plan. As a section of informing that inspection time is near, a producer may be directly informed (e-mail or mail) or information may be displayed on producer terminal 2. When information is displayed on producer terminal 2, a production facility is displayed by icon, or the like, on the map shown in FIG. 8, and, for example, a facility of which inspection time is near may be displayed by red and the other facilities may be displayed by blue. In this case, a process in producer terminal 2 is similar to the case in which the process of displaying a map on the above-described producer terminal 2.

Next, inspection support apparatus 1 according to the third modification will be described. In the third modification, a process for automatically making an inspection plan will be described.

Control section 11, for example, extracts inspection time (future) from production facility information stored in production facility information table 151 every certain period (one day, one week, one month).

Control section 11 has the function of a determination section that determines whether it is time when an inspection of a production facility is required. Control section 11 compares an inspection due date with a present date and determines whether it is shorter than or equal to a predetermined period. When it is shorter than or equal to the predetermined period, notification that inspection time is near is provided to a producer. Time to provide notification is, for example, one month before inspection time (future) that is an inspection due date.

Control section 11 selects an inspector candidate that satisfies a condition that inspection time (future) coincides with available inspection time from among inspector candidate information table 152 as an inspector. Control section 11 executes control for outputting a production facility that is a subject of inspection and inspection time (a specific date and time and a specific period may be designated).

The production facility and the inspection time are provided to the selected inspector candidate. When the inspector receives an order for an inspection of the production facility, an inspection plan containing the production facility, the inspection time, and the selected inspector candidate is provided to the producer.

Figure 10:
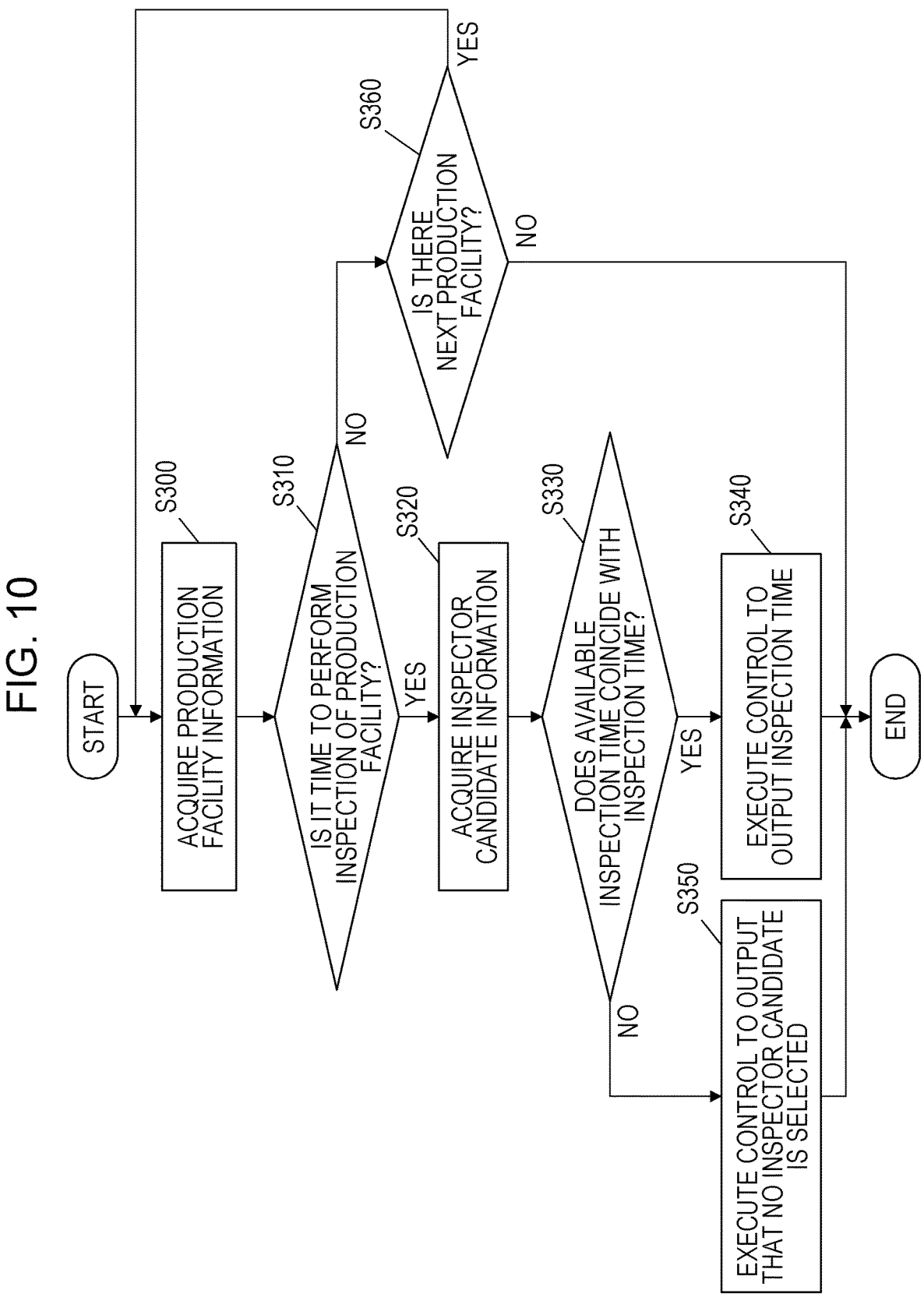
FIG. 10 is a flowchart showing an example of a process for automatically making an inspection plan.

Next, a process for automatically making an inspection plan will be described. Description will be made with reference to FIG. 10. FIG. 10 is a flowchart showing an example of a process for automatically making an inspection plan. The flow is automatically started each time a predetermined time (one day, one week, one month) elapses.

Initially, in step 5300, control section 11 acquires inspection time (future) from the production facility information stored in production facility information table 151. Inspection time (future) is determined in advance for each production facility or each piece of equipment in a production facility, and those pieces of information are stored in production facility information table 151.

Subsequently, in step 5310, control section 11 determines whether it is time when an inspection of the production facility is required. As a result of the determination, when it is time when an inspection of the production facility is required (YES in step S310), the process proceeds to step 5320. When it is not time when an inspection of the production facility is required (NO in step S310), the process proceeds to step 5360.

In step 5320, control section 11 acquires the inspector candidate information stored in inspector candidate information table 152.

Subsequently, in step 5330, control section 11 determines whether inspection time (future) coincides with available inspection time from among inspector candidate information table 152. As a result of the determination, when inspection time (future) coincides with available inspection time (YES in step S330), the process proceeds to step 5340. On the other hand, when inspection time (future) does not coincide with available inspection time (NO in step S330), the process proceeds to step 5350.

In step 5340, control section 11 executes control to output inspection time. After that, the process in FIG. 10 ends.

In step 5350, control section 11 executes control to output that no inspector candidate is selected for an inspector of the production facility. After that, the process in FIG. 10 ends.

Subsequently, in step 5360, control section 11 determines whether there is the next production facility. As a result of the determination, when there is the next production facility (YES in step S360), the process returns to the upstream of step 5300. On the other hand, when there is no next production facility (NO in step S360), the process in FIG. 10 ends.

With inspection support apparatus 1 according to the above-described third modification, an inspection plan for a production facility is automatically made at time at which an inspection of the production facility is required, so an inspection of the production facility is reliably performed without omission.

As described in the above embodiment and modifications, by saving, managing, and processing information on production facilities, information on inspectors, and information on inspection results by inspection support apparatus 1, various services are provided to producers and inspectors. Other than the above-described services, for example, position information of various equipment arrangements, and the like, of production facilities are output and provided from database 150 to producers.

In the above-described embodiment and modifications, a gas or petroleum-related production facility is used as an example of a subject to which the present invention is applied; however, the subject is not limited thereto and may be, for example, a production facility other than a gas or petroleum-related production facility.

The disclosure of Japanese Patent Application No. 2018-202999, filed Oct. 29, 2018 including the specification, drawings and abstract is incorporated herein by reference in its entirety.

The above-described embodiment is just an exemplary embodiment of the present invention, and the technical scope of the present invention should not be interpreted restrictively by the embodiment. In other words, the present invention may be modified in various forms without departing from its purport and its major characteristics.

REFERENCE SIGNS LIST

1 Inspection support apparatus
2 Producer terminal
3 Inspector candidate terminal
4 Camera
11, 21, 31 Control section
12, 22, 32 Operating section
13, 23, 33 Display section
14, 24, 34 Communication section
15, 25, 35 Storage section
100 Inspection support system
150 Database
151 Production facility information table
152 Inspector candidate information table
153 Producer information table
154 Inspection-related information table
200 Gas monitoring system

The invention claimed is:

1. An inspection support method for inspection of a gas or petroleum-related production facility, the inspection support method comprising:
receiving registration of producer information on a producer that owns or manages the production facility;
receiving registration of production facility information on the production facility;
receiving registration of inspector information on each of a plurality of inspector candidates that are candidates to inspect the production facility;
acquiring the registered production facility information on the production facility;
acquiring the registered inspector candidate information on the inspector candidate;
outputting inspection-related information containing inspection schedule information on a schedule of inspection of the production facility by the inspector candidate, based on the acquired production facility information and the acquired inspector candidate information; and
selecting, by a control section including a processor and memory, the inspector candidate from among the plurality of inspector candidates which satisfies a predetermined condition to perform an inspection of the production facility to create an inspection plan which is implemented on the production facility by the selected inspector candidate.

2. The inspection support method according to claim 1, wherein the inspection schedule information contains an inspector selected from among a plurality of the inspector candidates.

3. The inspection support method according to claim 2, wherein the production facility information contains scheduled inspection time at which an inspection of the production facility is required, the inspector candidate information contains available inspection time at which the inspector candidate is available for inspection, and the inspector is selected from among the inspector candidates based on the scheduled inspection time and the available inspection time.

4. The inspection support method according to claim 2, wherein the production facility information contains a place of the production facility, the inspector candidate information contains at least one of an address of the inspector candidate, a rating of the inspector candidate, information on an inspection capability of the inspector candidate, and an inspection fee of the inspector candidate, and the inspector is selected in consideration of at least one of the place of the production facility, the address of the inspector candidate, the rating of the inspector candidate, the information on the inspection capability of the inspector candidate, and the inspection fee of the inspector candidate.

5. The inspection support method according to claim 4, wherein the inspector is selected based on the place of the production facility and the address of the inspector candidate.

6. The inspection support method according to claim 1, further comprising:

determining a schedule for the same inspector candidate to perform an inspection on a plurality of the production facilities that are subjects of inspection, as the schedule of inspection.

7. The inspection support method according to claim 6, wherein the production facilities that are subjects of inspection are production facilities that a plurality of producers manages.

8. The inspection support method according to claim 4, wherein in the rating of the inspector candidate, the inspector candidate having a higher rating is selected as the inspector in preference to the inspector candidate having a lower rating.

9. The inspection support method according to claim 1, further comprising:

outputting, for the production facility that is a subject of inspection, inspection support information that supports an inspection of the production facility based on the production facility information.

10. The inspection support method according to claim 1, further comprising:

acquiring past inspection-related information on inspection previously performed on the production facility that is a subject of inspection; and outputting inspection support information based on the acquired past inspection-related information.

11. The inspection support method according to claim 10, wherein the past inspection-related information contains at least one of information on a production facility, information on settings of an inspection instrument, inspection schedule information, and information on an image capture environment, and inspection support information contains at least one of information on a production facility, scheduled for inspection, in a previously performed inspection, and information on settings of an inspection instrument.

12. The inspection support method according to claim 1, wherein an inspection of the production facility contains an inspection of detecting gas in a well facility.

13. The inspection support method according to claim 12, wherein an inspection of the production facility contains an inspection of detecting gas with an infrared camera.

14. The inspection support method according to claim 9, further comprising:

acquiring position information of an inspector that performs an inspection of a production facility;

identifying whether a production facility is a production facility to be inspected by the inspector in a nearest future based on position information of the inspector and position information of the production facility; and outputting the inspection support information upon identifying that the production facility is the production facility to be inspected in the nearest future.

15. The inspection support method according to claim 13, further comprising:

displaying an image of a production facility during inspection, captured by the infrared camera, and an image of the production facility, captured during previous inspection, side by side.

16. The inspection support method according to claim 13, further comprising:

displaying a visible image of a production facility, captured by a visible light camera, with a gas image captured by the infrared camera being superimposed on the visible image.

17. The inspection support method according to claim 1, further comprising:

determining whether scheduled inspection time at which an inspection of the production facility is required is near based on the production facility information; and outputting the scheduled inspection time to a producer that manages the production facility upon determining that the scheduled inspection time is near.

18. The inspection support method according to any claim 1, further comprising:

acquiring past inspection information on inspection previously performed on the production facility; and generating inspection record information indicating an inspection record of the production facility based on the acquired past inspection information.

19. The inspection support method according to claim 1, further comprising:

outputting, for each producer, inspection repair situation information indicating at least one of an inspection situation and repair situation of the production facility that the producer manages.

20. An inspection support apparatus, comprising:

a communication section receiving producer information on a producer that owns or manages a production facility associated with gas or petroleum, production facility information on the production facility, and inspector candidate information on an inspector candidate that is a candidate to inspect the production facility;

a storage section storing the producer information, the production facility information, and the inspector candidate information;

a production facility information acquisition section acquiring the production facility information from the storage section;

an inspector candidate information acquisition section acquiring the inspector candidate information from the storage section;

an inspection-related information output section outputting inspection-related information, containing inspection schedule information on a schedule of inspection of the production facility by the inspector candidate, based on the acquired production facility information and the acquired inspector candidate information; and a control section including a processor and memory, said control section selecting the inspector candidate from among the plurality of inspector candidates which satisfies a predetermined condition to perform an inspection of the production facility to create an inspection plan which is implemented on the production facility by the selected inspector candidate.

* * * * *